Sept. 4, 1962   G. W. WRIGHT ETAL   3,052,378
BOOSTER PUMPING SYSTEM
Filed June 13, 1956   3 Sheets-Sheet 1
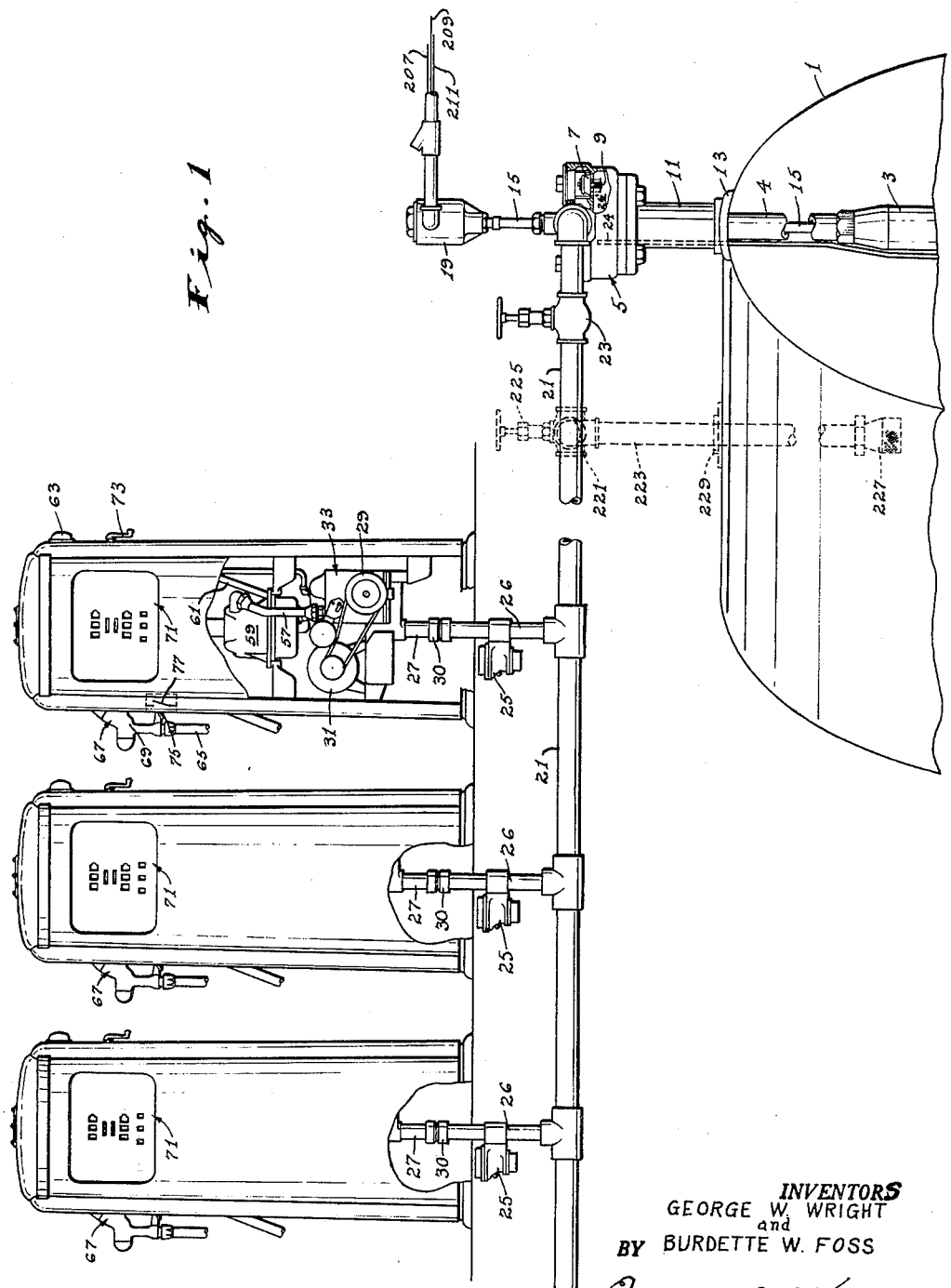
INVENTORS
GEORGE W. WRIGHT
and
BY BURDETTE W. FOSS
ATTORNEY

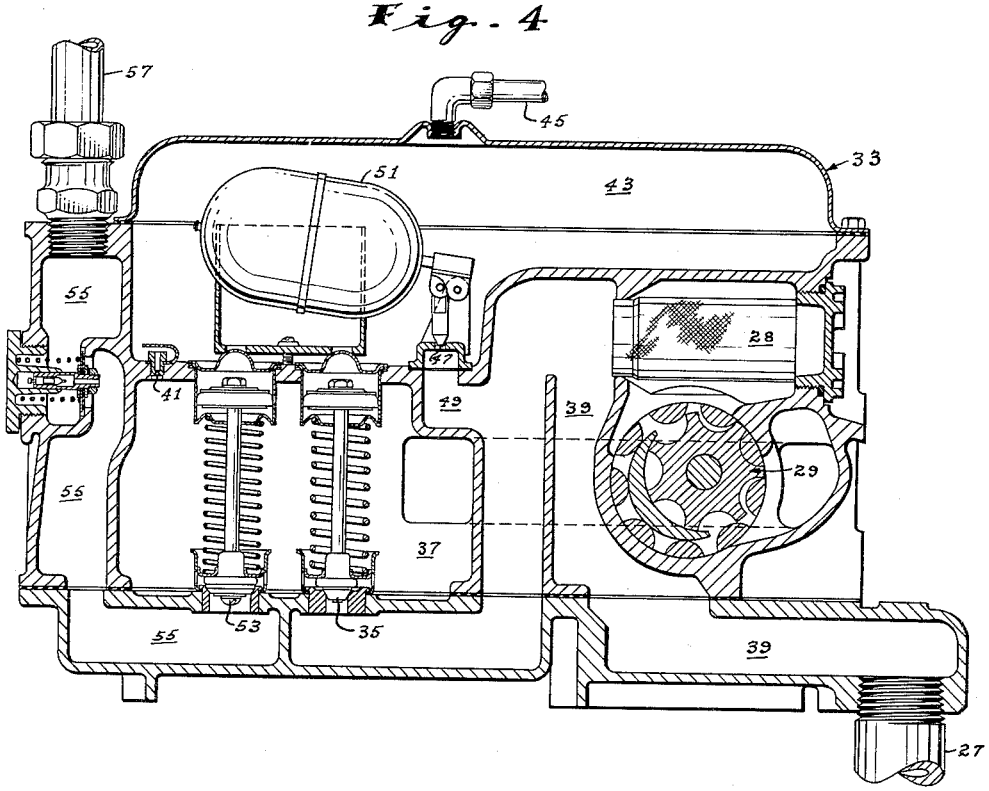
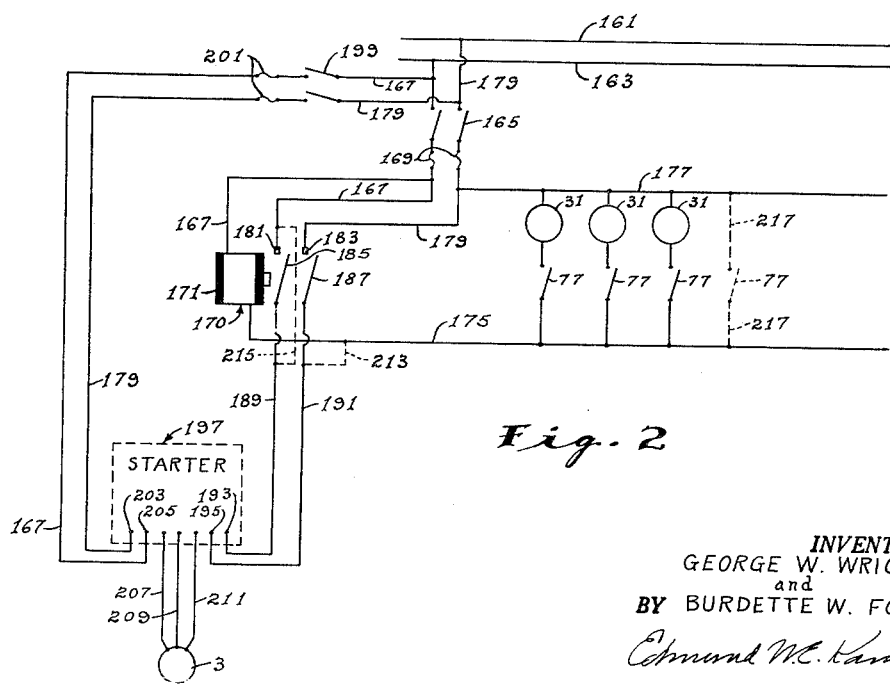

Sept. 4, 1962 G. W. WRIGHT ETAL 3,052,378
BOOSTER PUMPING SYSTEM
Filed June 13, 1956 3 Sheets-Sheet 3
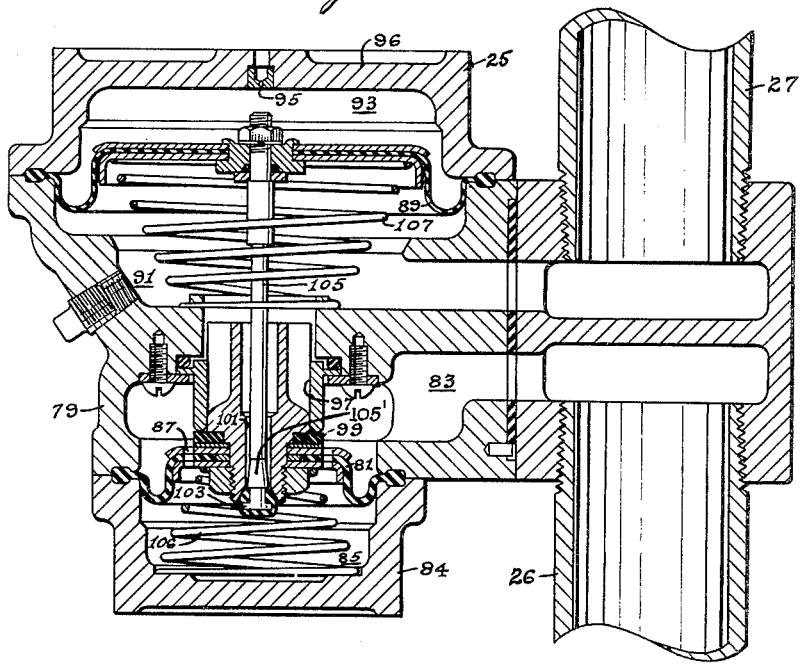
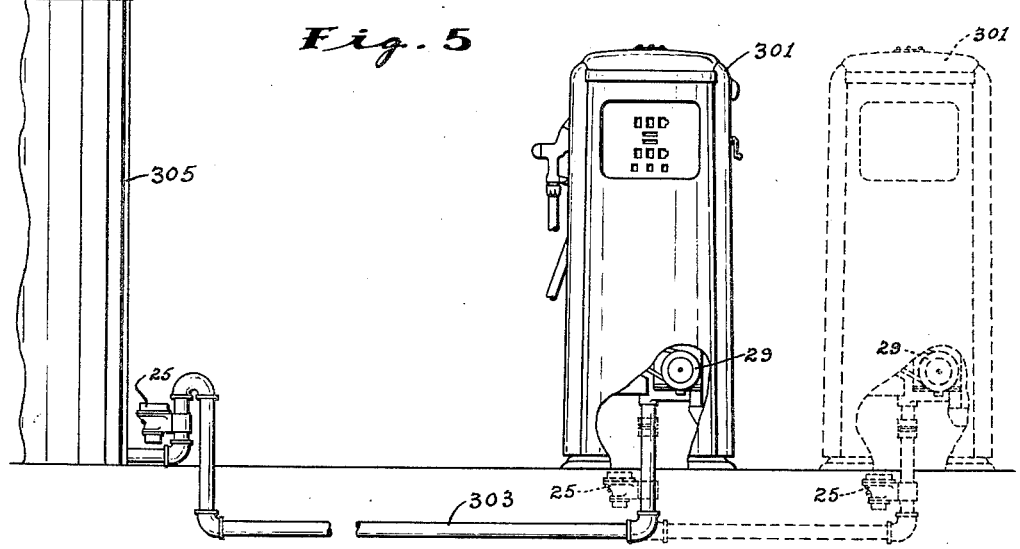
INVENTORS
GEORGE W. WRIGHT
and
BY BURDETTE W. FOSS
ATTORNEY even though the dispenser pump may

United States Patent Office 3,052,378
Patented Sept. 4, 1962

3,052,378
BOOSTER PUMPING SYSTEM
George W. Wright, Yoder, and Burdette W. Foss, Fort Wayne, Ind., assignors to Tokheim Corporation, Fort Wayne, Ind., a corporation of Indiana
Filed June 13, 1956, Ser. No. 591,188
20 Claims. (Cl. 222—63)

This invention relates to a booster pumping system for dispensing fuels, particularly such fuels as are prone to vaporize under high ambient temperatures and/or vacuum to produce "vapor lock" in the system.

Vaporization of fuels, such as gasolines, in fuel dispensing systems such as are used to fuel automobiles in the usual automobile "fiilling stations" has, in recent years, created problems in the dispensing of such fuels. Briefly stated, the vapor pressures of such fuels are being reduced and this results in the inability of the usual motor pump type of filling station dispenser, which is usually disposed at some distance from the tank, to lift the fuel from the storage tank, draw it through the lateral suction conduits to the pump in the dispenser and thereafter deliver the fuel under pressure to the vehicle tank. The fuels vaporize in the pipe when the suction is applied by the pump and either the pump fails to prime or its delivery is greatly reduced. These difficulties are usually experienced in hot weather when the pumps, lines and even the gasoline in the tanks become hot. Gasoline temperatures of 100 degrees Fahrenheit and higher are experienced and it has occurred several times that only one or two filling stations in a relatively large city were able to dispense any gasoline at all on hot days.

It is an object of the invention to provide a system which will insure that the fuel in a storage tank will be dispensed.

Another object of the invention is to provide a system to which an existing installation having motor pump dispensers can be readily converted.

A further object of the invention is to provide a system of the type described in which a remotely located and controlled motor and pump will be energized concurrently with any of the associated motor-pump dispensers, so that fuel will be supplied to the dispenser under pressure.

Yet another object of the invention is to provide means for preventing the loss of fuel through the gas venting system of the dispenser.

It is a further object of the invention to provide an electrical system which will cause any one of the dispensers to energize its own pump and the corresponding remote pump.

Yet another object is to provide a system which is capable of utilizing existing dispensing island wiring.

Another object of the invention is to provide a booster pump system in which the booster pump may be rendered inoperative when conditions do not require its use so that the system may be operated by operating one or more of the dispenser motor pumps.

A further object of the invention is to provide a control valve in advance of each dispenser pump for preventing the flow of fuel to the dispenser when the dispenser is not delivering fuel be running.

Yet another object of the invention is to provide a system of the type described in which a control valve which is responsive to the vacuum created by the associated dispenser pump, controls the admission of fuel to such dispenser pump.

Still another object is to provide a control valve at the inlet of each dispenser which throttles the rate of flow of fuel to the pump of such dispenser substantially in proportion to the rate of flow of the fuel being delivered by such dispenser.

Another object of the invention is to provide, in a system of the type described, a control valve which will prevent fuel from being drawn from the nozzle of an otherwise inoperative dispenser while the remote pump is operating.

These and other objects will become apparent from a study of this specification and the drawings which are attached hereto, made a part hereof and in which FIGURE 1 is an elevation of the fuel system showing the dispensers and the remote motor-pump.

FIGURE 2 is a wiring diagram of the system.

FIGURE 3 is an elevation in section of the control valve mechanism which is used to control the flow of liquid to the individual dispensers.

FIGURE 4 is a diagrammatic sectional view of a pedestal pump, air separator and by-pass mechanism.

FIGURE 5 is an elevation showing a modified system in which the source of supply is an elevated tank or a pressure tank.

HYDRAULIC SYSTEM (FIGURES 1 and 4)

Referring first to FIGURE 1, the numeral 1 represents an underground or other storage tank for the fuel, numeral 3 designates a submerged motor-pump unit which is supported by and connected to deliver fuel under pressure through a discharge pipe 4 to the header 5 which contains check valves 7 one of which contains a relief valve 9.

The header is supported on a large nipple 11 which is mounted on the tank flange 13. An electric conduit 15 conducts the electric wires 207, 209 and 211 from a swivel junction box 19 to the motor of the unit 3. The supply line 21 is connected through a valve 23 to the discharge port of the header.

If it is desired to use in the system any dispensers which are not equipped with motor pumps a restricted gas vent tube 24 should be disposed in header 5 with its inlet disposed adjacent the upper portion of the chamber 26' below the check valves and its outlet communicating with the space between the nipple 11 and discharge pipe 4. If it is desired to operate the system without the unit 3 operating, the lower end of the tube 24 should be kept submerged in liquid. The pipes and conduits 4, 11 and 15 are preferably concentric.

This structure is substantially the same as that disclosed in the patent application Serial Number 331,344 filed by Wright, Clymer and Jackson on January 15, 1953, now Patent Number 2,812,111 granted November 5, 1957, for Dispensing Apparatus for Liquid Fuel.

It should be noted at this point that instead of a submerged motor-pump, a turbine type pump in which the pump is immersed in the liquid in the tank and is connected by a long shaft to the motor which is mounted in a pit or a housing at the ground level may be used. Such a pump is disclosed in Patent No. 2,149,602 issued to A. G. Horvath on March 7, 1939. Or, if desired, the motor and pump may both be mounted on the surface or in a pit as shown in Patent No. 2,732,100 issued to Jackson et al. on January 24, 1956.

With the latter type of installation, the pump need only lift the fuel to the level of the pump and does not have imposed on it the additional suction load or friction losses of a relatively long substantially horizontal suction pipe which is often quite long and, being close to the surface of the ground, is heated during hot weather. Thus a pump of the type described will produce a flow of liquid and be substantially free from vapor lock when the dispenser type pump fails entirely.

The supply line 21 is connected by individual branches 26 to the various motor-pump pedestals each of which comprises a control valve 25 which is preferably located below ground level and has its inlet connected to the branch 26. Its outlet connected by a line 27, preferably through a grooved frangible or "breakaway" coupling 30 which is disposed above ground level, and through a strainer 28, to a pump 29 which has a suction port, a discharge port and which is driven by an electric motor 31. The pump 29 (FIG. 4) discharges into an air separator chamber 37 which is defined by a body 33 which also forms part of the pump and is shown generally in the Patent Number 2,289,003 issued July 7, 1942, to B. W. Foss.

A motor operated by-pass valve 35 is provided to permit circulation from the air separator chamber 37 back to the suction chamber 39 of the pump when the hose nozzle valve 69 is substantially throttled or closed.

A fixed but restricted orifice 41 is provided in the separator chamber through which separated gases and some liquid are discharged into a float chamber 43 which is provided with an atmospheric vent 45. Any liquid passing through the orifice is returned to the suction chamber 39 through a valve 47 and channel 49. A float 51 in chamber 43 controls the valve.

When the hose nozzle valve 69 is opened, liquid flows through a motor operated control valve 53, passage 55, in which is mounted a combination check and relief valve 56, and conduit 57 to a meter 59 where it is volumetrically measured.

Liquid leaves the meter through a dispensing line which comprises a pipe 61, passes through a visi-gauge 63 to the hose 65 and nozzle 67 which is fitted with a manually operable throttle valve 69.

The meter is connected mechanically to drive a register 71 which is usually of the "cost computer" type. The register is reset to zero by means of a hand crank 73.

The nozzle is usually supported on a switch lever 75 which is connected to operate a switch 77 which controls the motor 31 and the motor pump unit 3 as will be described below. The lever moves the switch to its "off" or open position when the nozzle is supported thereon and may be moved manually to the "on" or closed condition after the nozzle has been removed from the lever.

CONTROL VALVE (FIGURE 3)

It will be seen from an inspection of FIGURE 4 that if liquid were supplied under pressure to the chamber 39 when the pump 29 is inoperative or when the nozzle valve is closed or nearly closed even with pump 29 operating, liquid would be forced into the separator chamber 37 through the pump clearances and through the valve 35. Thereafter it would pass through the orifice 41 into chamber 43 and out the vent 45 and would be discharged exteriorly of the dispenser so as to create a fire hazard as well as to result in the wastage of a fairly expensive fluid.

The valve 25 prevents such discharge as will be seen from FIGURE 3 in which the body 79 and a diaphragm 81 define a first chamber 83 which communicates with the branch pipe 26 while this diaphragm and a cap 84 define a second chamber 85 which communicates with the first chamber through a restricted pressure balancing orifice 87.

The body and a second diaphragm 89 define a vacuum chamber 91 which communicates with the suction pipe 27 while an atmospheric chamber 93, which is vented through a restricted orifice 95, is defined by diaphragm 89 and a cap 96.

A port or passage 97 connects the chambers 83 and 91 in communication and is adapted to be opened, and closed or throttled by a valve 99 which is carried by the diaphragm 81. The valve is closed by movement of diaphragm 81 toward the port 97 and thus closes with the flow from the inlet chamber 83 to the outlet chamber 91.

The valve has a central port or passage 101 which connects the chambers 85 and 91 in communication and this port is opened, closed or throttled by a valve 103 which is disposed in chamber 85 and is supported on a stem 105 which runs through passage 101 into chamber 91 where it is fixed to the diaphragm 89. The stem 105, as shown in FIGURE 3, has an upwardly converging, tapered, flow metering section or element 105′ disposed immediately above the valve 103. The metering element coacts with port 101 to gradually restrict or increase the flow of fluid therethrough when the valve 103 is open and it is moved relative to the valve 99. The taper is longer and the included angle of the taper of this element is less than that of the valve 103 and the maximum diameter of the element is substantially the same as the minimum diameter of the valve 103, so that once the valve 103 is opened, the effective area of the port 101 and therefore, the flow through the port are governed by the axial position of the element 105′ with respect to the port. Valve 103 and port 101 tend to close both when diaphragm 89 moves away from port 101 or when valve 99 moves in an opening direction.

A spring 106 in chamber 85 acts on the diaphragm 81 in a direction to close valve 99 while a spring 107 disposed in chamber 91 acts on diaphragm 89 in a direction to close valve 103.

VALVE OPERATION

It will thus be seen that when no liquid under pressure is applied to chamber 83, the spring 106 will hold valve 99 closed and that when no vacuum is applied to chamber 91, the spring 107 will hold valve 103 closed. Spring 107, acting through stem 105 and valve 103, also helps to hold valve 99 closed.

So long as valve 103 remains closed, the valve 99 will remain closed even though liquid under pressure is applied to chamber 83 under pressure because the pressures in chambers 83 and 85 will be balanced through the orifice 87 and there will be no force applied to the diaphragm in a direction to overcome either spring 106 or 107.

No suction will be created in chamber 91, even with the associated pump 29 in operation, so long as the nozzle remains closed because under such conditions the by-pass valve 35 is wide open and liquid is merely circulated from chamber 39, through the pump 29 to chamber 37 and through valve 35 back to chamber 39. The valve 103 will therefore remain closed.

As soon as the nozzle valve 69 is opened even slightly, a slight vacuum is produced in chamber 91 and when the vacuum reaches a value high enough to enable the diaphragm 89 to overcome spring 107, valve 103 will open proportionately.

This then permits liquid to flow from chamber 85 through port 101 to chamber 91. When the flow of liquid through the valve exceeds the flow of liquid into chamber 85 through the orifice 87, the pressure in the chamber will drop below that in chamber 83 and when the differential pressure on the diaphragm is sufficient to overcome spring 106, the valve 99 will open to permit liquid to flow directly from chamber 83 to chamber 91 through port 97.

When this occurs, the movement of valve 99 relative to the metering element 105′ tends to close the port 101 and more nearly equalize the pressures in the chambers 83 and 85 so that the valve 99 will stop. Similarly, the pressure in chamber 91 tends to increase slightly which also tends to move valve 103 and metering element 105′ in a direction to cause 105′ to restrict the port 101, and thus further assists in more nearly equalizing the differential across the diaphragm 81. Thus the valves quickly reach a condition of equilibrium in which the opening of valve 99 is proportional to the rate of flow of the liquid being dispensed through the nozzle valve.

Should the nozzle valve be fully opened, a greater vacuum will be produced in chamber 91 and the valve 103 will open to a greater extent. This results in a wider opening of the valve 99 before equilibrium is established so that again the rate of flow of liquid through valve 99 is proportional to the flow through the nozzle.

The orifice 95 resists the rapid flow of air to and from chamber 93 and thus exerts a damping effect to reduce overtravel of the valve 103 in response to sudden changes of pressure in chamber 91 and, in turn, the valve 103 reduces overtravel of the valve 99 to reduce hunting action and to promote rapid attainment of the equilibrium condition.

Should the nozzle valve be closed or should the pump be stopped, the vacuum disappears entirely from chamber 91 and valve 103 will immediately be closed by spring 107. As soon as this occurs, the pressures in chambers 83 and 85 will become equalized through the orifice 87 and spring 106 will close valve 99 so that no liquid can flow to the dispenser even though pump 3 is held energized by another dispenser. Valve 103 remains closed as valve 99 closes.

It will thus be seen that the flow from branch 26 is held proportional to the flow from the nozzle and the dispenser is protected from excessive pressures which would tend to make the nozzle valve chatter and become unmanageable. Since all flow to the dispenser is stopped when no liquid is being drawn from it, the air release will not flood. Similarly, since the valve 99 is closed when the associated pump 29 is not operative, no liquid can be drawn from the inoperative pedestal and the air separator will not flood.

WIRING DIAGRAM

(FIGURE 2)

Referring to FIGURE 2, the electric supply main is represented by wires 161, 163 to which are connected the leads 167, 179 respectively. A switch 165 connects line 167 to one side of coil 171 of the relay 170 through a fuse 169. The other side of the coil is connected by wire 175 with one side of all of the dispenser switches 77 which are in turn connected through their respective motors 31 and wire 177 to the switch 165 and through it and wire 179 to main 161. Thus when the switch 165 and any one of the dispenser switches 77 are closed, both the associated motor 31 and the relay coil 171 will be energized.

Lines 167 and 179 are also connected by switch 165 to the contacts 181, 183 of the line relay 170. These contacts are connected by the blades 185, 187 of the relay and wires 189, 191 to the control terminals 193, 195 of a starter mechanism 197.

Power is supplied to the starter 197 from lines 167, 179 through the switch 199 and fuses 201 to the power terminals 203, 205 of the starter.

From the output terminals the wires 207, 209 and 211 conduct power to the motor of the submerged unit 3. One of the wires such as 207 is a neutral or common wire for both a starting winding and a running winding of the motor while the other wires 209, 211 each supply one of said windings.

CHARACTERISTICS OF THE SYSTEM

The usual system described above is operated from a 60 cycle, 230 volt, single phase A.C. source. The motor of the unit 3 is usually of ¾ horse power rating while the motors 31 usually operate on 230 volt, 60 cycle current and are rated at ⅓ horsepower. Of course, by suitable connections to the mains, the dispenser motors may be supplied with current at a different voltage.

Any suitable power supply may be used if the starter and motors are supplied to correspond. Further the horsepower of the motors may be varied if desired.

It should be noted that the current supplied to all of the motors 31 passes through the coil 171 of relay 170 and for this reason the relay must be constructed to pass the current which would be drawn by all of the motors 31 since they may be operated simultaneously.

While a much smaller unit 3 than that supplied would insure the proper priming and vapor free operation of the pumps 29 in systems dispensing lower vapor pressure fuel, or having low head losses, a unit 3 which is large enough to supply all of the pedestals connected to it without assistance from the pumps 29 is usually installed so that at a later date the motor pump dispensers may be replaced by dispensing pedestals such as those shown in the Wright et al. patent mentioned above to convert the system into one such as that shown in the patent.

Obviously, the valves 25 and the relay 170 would no longer be required in the converted system and the conversion can be readily made by removing the relay 170, and by connecting wire 191 to wire 175 and wire 189 to wire 167 by wires 213 and 215 as shown in dashed lines (FIG. 2). The switches 77 of the pedestals will be connected directly between the wires 175 and 177 as shown by dashed lines 217 (FIG. 2) so that the closure of any one of the switches will energize the starter 197 and start the unit 3. The wire 179 would of course have to be broken below its connection with wire 177. This would be effected by removing it with the relay 170.

OPERATION

Assuming that the unconverted system is in the power-off condition with switches 165 and 199 closed and none of the pumps running, the operator will remove a nozzle 67 from one of the switch levers 75 and move the latter upwardly to close a switch 77. This action will energize the associated motor 31 and the relay 170. The latter closes contacts 181, 183 to energize the starter 197 which in turn starts the motor-pump unit 3.

Since these events occur substantially instantaneously, the pumps will both be running before the operator opens the nozzle valve. Accordingly, as explained above, the by-pass valve 35 will be open and the valves 99 and 103 will remain closed.

When the operator has inserted the nozzle in the vehicle tank, he will usually open the nozzle valve to discharge a substantial stream. This reduces the pressure in the air separator chamber 37 and the by-pass valve 35 will close. The pump 29 will then produce a vacuum in chamber 39, pipe 27 and chamber 91 so that the control valve 103 will be opened by the action of diaphragm 89. This unbalances the pressures on diaphragm 81 by reducing the pressure in chamber 85 and the diaphragm 81 in turn opens valve 99 as described above. Liquid will therefrom be supplied to the chambers 91 and 39 by the unit 3.

When the operator throttles the nozzle valve, as in topping off the tank, the pressure in chamber 37 rises to by-pass pressure and valve 35 opens. The vacuum in chamber 91 dissipates to the extent that the valve 103 is less fully open and valve 99 throttles accordingly. When the nozzle valve is fully closed, valve 35 is fully open, the vacuum in chamber 91 dissipates entirely and valve 103 fully closes. Valve 99 then closes and all flow from pump 3 to the dispenser ceases. This condition remains unchanged when the pump 29 is stopped.

In other words the by-pass valve opening follows the nozzle valve in an inverse relation, the greater the nozzle valve opening the smaller the by-pass valve opening to the point that the by-pass valve closes entirely. The control valve follows the nozzle valve directly and the by-pass valve inversely in that it opens wider as by-pass valve closes and reaches its maximum opening after the by-pass valve closes entirely.

In this way the full pressure of the unit 3 is not applied to the nozzle valve when the latter occupies a nearly closed or fully closed position and the full pressure is not applied to the nozzle valve except when it is substantially open.

Restoration of the nozzle to the hose hook results in the depression of lever 75, the opening of the switch 77 and de-energization of relay 170 and starter 197 so that both pump 29 and unit 3 are stopped. If another dispenser is operating unit 3 will not stop.

It should be noted that the valves 25 of the other dispensers which are not in use are closed during the described operation and such valves will open only when the associated pumps 29 are energized and the associated nozzle valve is opened. Thus leakage from such dispensers and delivery from the nozzles thereof is effectively prevented. Were this not the case, liquid could be obtained from inoperative dispensers without resetting the registers in violation of weights and measures regulations.

It will also be seen that the unit 3 may be disabled at any time by merely opening the switch 201. Since a pump of the submerged or turbine type unit comprises a centrifugal type impeller, there is an open fluid passageway through the unit at all times. Thus in weather when vapor lock does not constitute a problem, it is possible to operate only the motor-pump units of the dispensers to secure delivery of liquid without using the unit 3.

Since the valve 103 is opened solely in response to the vacuum in chamber 91, it will be seen that with unit 3 idle, this vacuum will be applied to chamber 85 and in view of the restriction imposed by the orifice 87, will unbalance the pressures on the diaphragm 81 in the same manner as described above so that the valve will operate in the same way as it does when unit 3 is operating.

The opening of switch 165 will, of course, disable the motors 31 and the relay 170 in the event it is desired to shut down the system for repairs or other reasons, while switch 199 will disconnect the unit 3 and the contacts of the starter from the supply lines. Both switches are preferably opened when the station is closed down so that the entire system is disconnected from the electric mains.

It should be noted that in the event the dispenser is struck by a vehicle and the blow is severe enough to break line 27, the break will occur at the weakened section of coupling 30 and the valve 25 will close because the suction effect of the pump of the damaged dispenser is removed from the valve.

MODIFICATION

If desired a T 221 may be inserted in the line 21 and a suction line 223 having a shut-off valve 225 and a foot valve 227 may be connected to the T and to the same tank by means of a flange 229 in the conventional manner so that the system may operate in the conventional manner while the unit 3 is being repaired or replaced or when the unit 3 is of the positive displacement type which does not have an open fluid passageway therethrough and would thus severely restrict the flow of liquid therethrough in the event that it is rendered inoperative for any reason. Thus by opening valve 225, closing valve 23 and opening switch 199, the unit 3 would be entirely isolated from the system. When the unit 3 is operating, the valve 225 would be closed and valve 23 open and in such case the unit 3 would operate as a booster pump as described above.

SECOND MODIFICATION

(FIGURE 5)

FIGURE 5 shows a system in which a motor pump type of dispenser 301 is connected to a liquid supply line 303 which is connected at its other end to an above ground supply tank 305 or other source of liquid under pressure through a control valve 25.

When a single dispenser is used with the line 303, the valve 25 is preferably located adjacent the tank 305 so that it will protect the line as well as the dispenser against leakage.

If a number of dispensers are used on the line, a valve is used adjacent each dispenser and, if desired, an additional valve may be used adjacent the tank.

As will be understood from the prior detailed explanation of operation, the valve 25 cannot open until a vacuum has been applied to the diaphragm 89, consequently until line 303 is evacuated by the dispenser pump, no liquid can flow through the valve 25 to line 303 and be lost through any leaks or breaks therein. If the leaks are substantial, the air flowing in through them may be sufficient to prevent the establishment of the vacuum required to open the valve and in such case the system will be inoperative until the leaks are repaired.

In the case of the use of valves 25 in series as shown in FIGURE 5, by the dashed lines, the operation of any pump will create the vacuum necessary to open the valve 25 adjacent the pump after which it will evacuate the line 303 and apply the vacuum to the valve 25 adjacent the tank 305 which will then open to admit liquid to the line and eventually to the pump 29 from which it will be dispensed. The valves 25 of the other dispensers will not open.

It is obvious that various changes may be made in the form, structure and arrangement of parts of the specific embodiments of the invention disclosed herein for purposes of illustration, without departing from the spirit of the invention. Accordingly, applicants do not desire to be limited to such specific embodiments but desire protection falling fairly within the scope of the appended claims.

We claim:

1. In a pumping system, first and second pumps each having an inlet and an outlet, means, including a control valve adjacent the inlet of the second pump, for connecting the outlet of the first pump in communication with the inlet of the second pump, a by-pass-channel, including a relief valve, connecting the outlet and inlet of said second pump, a dispensing line, including a nozzle valve, connected to the outlet of the second pump, the pressure at the inlet of the second pump being a function of the flow through the nozzle valve by reason of the action of said relief valve, and power means actuated by said pressure for operating the control valve.

2. In a pumping system, first and second pumps each having an inlet and an outlet, means, including a control valve adjacent the inlet of the second pump, for connecting the outlet of the first pump in communication with the inlet of the second pump, a by-pass channel, including a relief valve, connecting the outlet and inlet of said second pump, a dispensing line, including a nozzle valve, connected to the outlet of the second pump, the pressure at the inlet of the second pump being a function of the flow through the nozzle valve by reason of the action of said relief valve, and power means responsive to said pressure for operating the control valve so as to throttle the flow of liquid to said inlet substantially as the nozzle valve is throttled and to close said control valve both when said nozzle valve is closed and when said second pump is stopped.

3. In a pumping system, first and second pumps each having an inlet and an outlet, means, including a control valve adjacent the inlet of the second pump, for connecting the outlet of the first pump in communication with the inlet of the second pump, said valve being mounted so as to close with the flow of liquid therethrough, a by-pass channel, including a relief valve, connecting the outlet and inlet of said second pump, a dispensing line, including a nozzle valve, connected to the outlet of the second pump, the pressure at the inlet of the second pump being a function of the flow through the nozzle valve by reason of the action of said relief valve, and means responsive to a vacuum at the inlet of the second pump for opening said control valve.

4. In a pumping system, first and second pumps each having an inlet and an outlet, means, including a control valve adjacent the inlet of the second pump, for connecting the outlet of the first pump in communication with the inlet of the second pump, said valve being mounted so as to close with the flow of liquid therethrough, a by-pass channel, including a relief valve, connecting the outlet and inlet of said second pump, a dispensing line, including a nozzle valve, connected to the outlet of the second pump, the pressure at the inlet of the second pump being a function of the flow through the nozzle valve by reason of the action of said relief valve, and means responsive to a vacuum at the inlet of the second pump for opening said control valve to a degree corresponding with the value of the vacuum.

5. In a liquid pumping system, a first pump, a number of dispensers each having a second pump, a by-pass, including a relief valve, connecting the outlet with the inlet of the associated second pump, an air separator connected to the outlet of the second pump, an open, atmospheric vent for said separator, a dispensing line, including a nozzle valve, connected to receive liquid under pressure from its air separator, an individual control valve connected to the inlet of each second pump, means including a discharge line for connecting the outlet of said first pump with the inlet of each of said control valves, the operation of said nozzle and relief valves of each dispenser serving to vary the pressure at the inlet of the associated second pump when said second pump is operating and means responsive to said pressure for operating said control valve to throttle the rate of flow of liquid through said control valve to the associated second pump substantially in proportion to the rate of flow of liquid through said nozzle valve.

6. The structure defined by claim 5 including a motor connected to operate said valve, and controlled by said pressure responsive means said latter means serving to cause said motor to open the control valve when a vacuum is created at the inlet of the associated second pump.

7. The structure defined by claim 5 wherein said pressure responsive means comprises diaphragm means which has one side exposed in open communication with the inlet of the associated second pump and the opposite side exposed to atmospheric pressure, means operable by said diaphragm means for opening said control valve when the inlet pressure becomes less than atmospheric and yieldable means disposed to urge said control valve closed.

8. The structure defined by claim 7 including a second diaphragm, means connecting one side of said second diaphragm in communication with said supply line and the other side of said second diaphragm with the inlet of the associated pump, said supply line pressure acting on one side of said second diaphragm to urge it in a direction to open the control valve, yieldable means for urging said control valve in a closing direction, an orifice connecting the other side of said second diaphragm in communication with supply line pressure, said means operable by said diaphragm means including a valve, a port controlled by said value for controlling the communication between the second diaphragm and the inlet of the associated pump, said orifice being restricted as compared to said port.

9. In a liquid dispensing system, the combination of a delivery line, means for supplying liquid under pressure to said line, a motor pump connected to draw liquid from said line, a normally closed valve disposed in said line between said motor pump and liquid supplying means, said valve being constructed so as to close with the flow of liquid to said pump, and power means responsive to the vacuum created by operation of said motor pump for opening said valve.

10. The structure defined by claim 9 wherein said means for supplying liquid includes a tank disposed so that liquid is supplied to said delivery line, from said tank, under continuous static head pressure, and wherein said valve is disposed closely adjacent the tank.

11. In a liquid dispensing system, the combination of a delivery line, means for supplying liquid under pressure to said line, a number of motor pumps connected to branches from said line, a normally closed valve in each branch, said valve being constructed so as to close with the flow of liquid to the pump in said branch and power means responsive to the vacuum created by one of said pumps for opening the associated valve in the branch supplying said pump.

12. The structure defined by claim 11, wherein an additional, normally closed valve is provided in the supply line and includes means responsive to the vacuum in said supply line for opening said additional valve.

13. The structure defined by claim 12 wherein said means for supplying liquid includes a tank disposed so that liquid is supplied to said delivery line, from said tank, under continuous static head pressure, and wherein said additional valve is disposed closely adjacent the tank.

14. In a pumping system for volatile liquids, the combination of a storage tank, a first motor pump disposed in communication with the tank and having its inlet flooded by the liquid in the tank, said first motor pump comprising an impeller and a body which define an open, unobstructed channel for liquid through the pump, a discharge conduit connected to receive liquid under pressure from said pump, a number of second motor pumps disposed at a point remote from said first pump and having their inlets connected in communication with said conduit, selectively operable means for starting and stopping said second motor pump, additional means responsive to the starting of any of said second motor pumps for starting the first motor pump and means operable at will for disabling said additional means, said second motor pumps serving to withdraw liquid from said tank through said unobstructed channel and said discharge conduit while said additional means is disabled, a normally closed control valve for each second motor pump, having its inlet connected to the discharge conduit and its outlet connected to the suction port of the associated second motor pump, and power means responsive to the occurrence of suction at the outlet of a control valve for opening such valve.

15. In a pumping system for volatile liquids, the combination of a storage tank, a first pump disposed in communication with the tank and having an inlet communicating with the liquid in the tank, a discharge conduit connected to receive liquid under pressure from said first pump, a number of additional pumps, disposed at points remote from said first pump, and each having a suction port, a discharge port and a delivery line including a manually operable discharge valve connected to the discharge port, a normally closed control valve for each additional pump, having its inlet connected to said conduit and its outlet connected to the suction port of the associated additional pump, said valve being constructed so as to close with the flow from its inlet to its outlet and means responsive to suction at the outlet, created by said additional pump, for opening said control valve.

16. The structure defined by claim 15 which includes a second, substantially unobstructed conduit connected at one end with said discharge conduit and having its other end submerged in the liquid in said tank, a manual valve for said conduit, said second conduit serving as a by-pass for said first motor pump when said manual valve is opened, to enable liquid to be drawn into said discharge conduit by any of said additional pumps, when said first pump is disabled.

17. In a pumping system for volatile liquids, the combination of a storage tank for liquid, a first pump disposed in the tank and having its inlet disposed to withdraw liquid from the tank, a discharge conduit connected to receive liquid under pressure from said pump, a first electric motor connected to drive said pump, control means for starting and stopping said motor, a number of liquid dispensers disposed at points remote from said first pump, each dispenser comprising a dispenser pump, having a suction and a discharge port, an electric dispenser motor connected to drive the dispenser pump, a manually operable switch for starting and stopping said dispenser motor, a dispensing line connected to the discharge port and a manually operable valve in said line, each dispenser pump having its suction port connected to said discharge conduit and means for connecting said dispenser switches in multiple to actuate the control means of said first motor so that said first motor will be energized when any dispenser motor is energized, a normally closed valve for each dispenser, having its inlet connected with said discharge conduit and its outlet connected to the suction port of the associated dispenser, and power means controlled by the suction pressure at said outlet for opening the valve.

18. In a pumping system for volatile liquids, the combination of a storage tank for liquid, a first pump disposed in the tank and having its inlet disposed to withdraw liquid from the tank, a discharge conduit connected to receive liquid under pressure from said pump, a first electric motor connected to drive said pump, control means for starting and stopping said motor, a number of liquid dispensers disposed at points remote from said first pump, each dispenser comprising a dispenser pump, having a suction and a discharge port, an electric dispenser motor connected to drive the dispenser pump, a manually operable switch for starting and stopping said dispenser motor, a dispensing line connected to the discharge port and a manually operable valve in said line, each dispenser pump having its suction port connected to said discharge conduit and a normally closed valve for each dispenser having its inlet connected with said discharge conduit and its outlet connected to the suction port of the associated dispenser pump, and power means actuated by the suction pressure at said outlet for opening said valve.

19. In a pumping system for volatile liquids, the combination of a storage tank for liquid, a first pump disposed adjacent the tank and having its inlet disposed to withdraw liquid from the tank, a discharge conduit connected to receive liquid under pressure from said pump, a first electric motor connected to drive said pump, a liquid dispenser disposed at a point remote from said first pump, said dispenser comprising a dispenser pump, having a suction and a discharge port, an electric disposer motor connected to drive the dispenser pump, a manually operable switch for starting and stopping said first motor and said dispenser motor, a dispensing line connected to the discharge port and a manually operable valve in said line, and a normally closed valve for said dispenser having its inlet connected with said discharge conduit and its outlet connected to the suction port of the associated dispenser pump, and power means actuated by the suction pressure at said outlet for opening said valve.

20. In a pumping system for volatile liquids, the combination of a storage tank for liquid, a first pump, disposed in communication with the tank and having its inlet disposed to withdraw liquid from the tank, a discharge conduit connected to receive liquid under pressure from said pump, a first electric motor connected to drive said first pump, control means for starting and stopping said first motor, a number of liquid dispensers disposed at points remote from said first pump, each dispenser comprising a dispenser pump, having a suction and a discharge port, an electric dispenser motor connected to drive the dispenser pump, a manually operable dispenser switch for starting and stopping said dispenser motor, a dispensing line connected to the discharge port and a manually operable valve in said line, each dispenser pump having its suction port connected to said discharge conduit, and a normally closed control valve for each dispenser having its inlet connected with said discharge conduit and its outlet connected to the suction port of the associated dispenser pump and power means actuated by the suction pressure at said outlet for opening said valve, and means for connecting said dispenser switches in parallel with each other and in series with said relay to actuate said relay and the control means of said first motor when any dispenser switch is closed so that said first motor will be energized when any dispenser motor is energized.

References Cited in the file of this patent

UNITED STATES PATENTS

| | | |
|---|---|---|
| 1,071,777 | Murphy | Sept. 2, 1913 |
| 1,963,783 | Fox | June 19, 1934 |
| 1,990,524 | Bystricky | Feb. 12, 1935 |
| 2,149,602 | Horvath | Mar. 7, 1939 |
| 2,330,558 | Curtis | Sept. 28, 1943 |
| 2,394,431 | Curtis et al. | Feb. 5, 1946 |
| 2,414,158 | Mock | Jan. 14, 1947 |
| 2,490,555 | Songer | Dec. 6, 1949 |
| 2,664,102 | Coberly | Dec. 29, 1953 |